United States Patent Office 3,110,545
Patented Nov. 12, 1963

3,110,545
INORGANIC FIBERS AND PREPARATION
THEREOF
Robert M. Beasley, Shaker Heights, and Herbert L. Johns, Cleveland, Ohio, assignors to Horizons Incorporated, a corporation of New Jersey
No Drawing. Filed Dec. 1, 1958, Ser. No. 777,193
20 Claims. (Cl. 18—54)

This invention relates to the preparation of fibers. More particularly it relates to a method of preparing fibers of inorganic materials from either solutions or from dispersed dispersions of very finely divided solids in a liquid. Fibers so prepared have been found to possess outstanding properties as insulation against heat or sound.

Briefly, in accordance with the present invention it has been found that when the liquid phase is removed from thin films of a suitable composition, disposed on a surface to which the composition does not adhere, a product is produced comprising a plurality of discrete fibers. It has been further found possible to control the dimensions and properties of these fibers by varying the manner in which the process is carried out or by appropriate after-treatments.

The term "colloid" does not define a distinct state of matter, but rather the degree of subdivision of a substance. In liquid-solid systems, in which a solid phase is dispersed in the liquid phase various possibilities may be postulated. The solid may be relatively coarse, in which instance the system is visibly a dispersion of coarse solid particles in a liquid. As the solid becomes increasingly finer, "dispersion" is ultimately considered to be more properly defined as a solution. In the practice of the present invention the results obtained appear to be of greatest value in systems in which a solid phase composed of particles finer than about 0.2 micron and even finer than 0.0001 micron and in which the liquid phase is preferably, but not necessarily, water. While this range of particle sizes is preferred, it will be understood that even finer particles may be used with results which are satisfactory for some purposes, and that solutions have been used in the same manner as dispersions, with equally remarkable results.

For purposes of illustration this invention will be described in terms of systems in which the dispersed solid phase preferably exhibits only a very limited solubility in the dispersing liquid and which when dried yield water-insoluble products but it is to be understood that the invention may be applied to other suitable solid or liquid materials than those selected for purposes of illustration without departing from the scope of the invention.

Dispersions of solids in liquids may be broadly designated as lyophobic sols or lyophilic sols. Lyophobic (solvent hating) sols are those colloidal dispersions in which there is little or no attraction between the dispersed phase and the medium, as in dispersions of colloidal metals in water. Lyophilic (solvent loving) sols, on the other hand, are dispersions in which the dispersed phase exhibits a substantial affinity for the dispersing medium with consequent extensive solvation of the colloidal particles. Glue, gelatine and other proteins are examples of lyophilic sols.

It was found that if a lyophobic sol such as the silica sol commercially identified by the tradename "Ludox" was spread on a polished glass surface and allowed to dry, the dried product could be in the form of sheets, films, random rectangular blocks, filaments or fibers.

The present invention is concerned with a process of drying thin films of lyophobic sols, or mixtures of lyophobic sols, or mixtures of lyophobic sols with other compounds (either dispersed or in solution), while such films are supported on a surface to which they do not stick, and under conditions which resulted in the formation of long filaments or fibers.

To insure the formation of long filaments or fibers it is necessary that the surface upon which the colloidal sol is placed be smooth and relatively free from scratches and that the sol be spread on the surface in a very thin layer.

By varying the thinness of the film, the dimensions of the resulting fibers may be influenced. In general the thinner the film, the smaller the cross sections of the resulting fibers. For example with films of a colloidal silica dispersion having an original thickness of about 20 microns, the fibers produced by rapid drying were found to be about 10 microns thick, 20 to 40 microns wide and 2 to 3 inches in length. The effect of film thickness varies with the different materials, and therefore, must be established for each type and concentration of sol.

The dimensions of the fibers may also be influenced by varying the rapidity with which the liquid phase is removed from the system and the drying conditions such as humidity and temperature of the drying environment during this removal. The specific effect of these variables must be established for each sol. However, it has generally been found that smaller cross section products may be formed by the use of higher temperatures and conversely. Thus, as noted in the preceding paragraph, the thickness of the resulting solid products may be controlled most readily by controlling the thickness of the liquid dispersion or sol initially applied to the support. The width of the filaments may be decreased by increasing the temperature at which liquid is eliminated, or may be increased by decreasing the temperature. The third dimension, length, may be influenced by the depth and area of the starting layer of liquid dispersion or sol, the technique and environment of drying, the pH of the sol, and the character of the surface on which the liquid is dried. Fibers can be terminated at predetermined points by placing scratches or discontinuities on the drying surface, at any desired location, and this serves as a method of controlling the length of the filaments.

By way of example, films 36 microns thick dried in an oven at about 200° C. produced fibers six microns thick by twelve microns wide and up to three inches long.

While not wishing to be bound by any particular theory, it is presently believed that the mechanism of fiber-formation is based on the fact that colloidal suspensions (sols, not gels), when placed on a flat or curved surface in a small thickness, will shrink in size as water is evaporated. Evaporation takes place at all exposed surfaces, but drying occurs first at the edge of the layer. The complete removal of water results in shrinkage approaching 1 cc. for each cc. of water removed. The shrinkage induces high tangential strains at the drying edges and radial strains perpendicular to the drying edge. Radial strains may occur without creating too much stress because the material can pull free of contact with the plate by curling away from it. The tangential strains, however, induce high tangential stresses and break the drying films in lines perpendicular to the direction of the tangential strain. In the process, the fibers appear gradually as the colloidal suspension dries.

Fibers prepared by removing the liquid phase from colloidal suspensions contain submicroscopic capillaries as pores or channels. These capillaries may be filled either with additional similar material or with other materials in solution or vapor form. Although it was not necessary in fiber preparation, it is preferred to close the capillaries, either filled or as formed in the fiber, by sintering the fibers at elevated temperatures. The sintering schedules necessary for closing these capillaries vary with each composition; however, they were generally found to resemble the time-temperature relations established for ceramic materials having the same composition. The sintering treatment was usually accompanied by approximately a ⅓ reduction (shrinkage) of the volume of a fiber.

The following examples are given by way of illustration of the best mode of practicing certain aspects of the invention and are to be taken as illustrative rather than limitative.

EXAMPLE 1

Silica

Silica sols—consisting of 30% or less $SiO_2$ and 70% or more $H_2O$ with a pH @ 25° C. between at least 2 or sufficient to avoid gel formation and not over 10, or less than that at which the sol coagulates and with viscosities between 2 and 7 centipoises was flowed onto a smooth glass surface, the excess sol was drained off, and then the remaining films were dried at temperatures between room temperature and 220° C. The products were discrete silica fibers having submicroscopic capillaries.

With the above techniques, the best results or finest fibers were obtained using the following conditions:
 (1) 15% silica concentration.
 (2) At 25° C., pH of 4.
 (3) Drying at 180° C. with the film on the bottom side of a flat glass plate that was inclined at an angle of 30° to the horizontal.

From an original liquid film spread on a 6" x 6" surface the product was long fibers—up to 3 inches in length of an average cross section of about 15 microns by 6 microns. Upon sintering to close the capillaries, a reduction in volume of about 30% was noted.

EXAMPLE 2

96% Silica, 4% Boric Oxide

Boric acid was added to silica sols in amounts up to 4% by weight. Films of the sols were processed as in Example 1 and yielded fibers with improved sinterability and a diminished tendency to devitrify.

EXAMPLE 3

Zirconia

A zirconia sol ("colloidal zirconia 180," a product of E. I. du Pont) was dried in the manner described in Example 1 and yielded fibers as a product.

The starting material produced better fibers when it was diluted about 4::1 with water and the pH was held below 2.

EXAMPLE 4

Synthetic Boron Mica

A suspension of ball milled synthetic boron mica was made by adjusting the pH to 6 with boric acid. When this suspension was drided as previously described, fibrous products were obtained. The fibers were then sintered at 950° C. for 30 minutes, which resulted in a sealing of the capillaries.

EXAMPLE 5

A composition consisting of the following (in parts by weight) was formulated (each additive being first dissolved or dispersed in an aqueous carrier).

| | |
|---|---|
| Zirconium acetate | 0.610 |
| Alumina | 0.150 |
| Zirconia sol | 1.295 |
| Calcium chloride | 0.075 |
| Zirconium oxychloride | 0.165 |
| Thorium oxide | 0.030 |

A thin film of the composition was spread on a clean glass surface by means of a doctor blade and thereafter dried at 150° C. to 200° C. Fibers were readily obtained as a result of this treatment.

In addition to the systems exemplified in the preceding examples, we have processed suspensions of finely divided: alumina; aluminum acetate; chromium acetate; zirconium acetate; combinations of alumina and silica; and combinations of alumina, silica and zirconia.

The fibers produced from the rapid removal of liquid from such systems were subjected to temperatures as high as 4000° F. to 5000° F. without any noticeable effect thereon. A loose layer of fibers about ⅛ inch thick maintained aluminum solid (unmelted) even when an oxy-acetylene flame was played on the fibers for a sustained interval of time.

It has been further observed that a large number of variables may have a significant bearing on the nature of the product produced. These included:
 (1) The pH and concentration of the material.
 (2) The pH and concentration of any added material.
 (3) The temperature of the materials prior to the liquid removal step.

Thus for zirconia sols a pH of 3 to 5 and a zirconia content of less than 5% by weight yielded especially good fibers. However, fibers could be formed from sols having a pH from 1 to 5.5 with zirconia concentrations from 0.5% to 25%, the average particle size being about 5 millimicrons.

We claim:

1. A method of preparing inorganic filaments of rectangular cross section and having aspect ratios as follows: length to thickness ratio of at least about 1000 to 1 and width to thickness ratio of between about 1 to 1 and 10 to 1, which comprises: spreading a thin film of a colloidal dispersion of a lyophobic soil of an inorganic material on a smooth solid surface, said film having a thickness between about 5 microns and 50 microns; drying the thin film to remove the liquid content thereof and thereby fracturing the resulting dried film; removing the fibers formed by the fracturing of said film from the smooth supporting surface, and thereafter heating the fibers produced by the fracturing of said film during the removal of liquid, said heating being effected at a temperature and for a time sufficient to close the capillaries in said fibers.

2. A method of preparing inorganic filaments of rectangular cross section and having aspect ratios as follows: length to thickness ratio of at least about 1000 to 1 and width to thickness ratio of between about 1 to 1 and 10 to 1, which comprises: spreading a thin film of a colloidal dispersion of a lyophobic sol of an inorganic material on a smooth solid surface, said film having a thickness between about 5 microns and 50 microns; drying the thin film to remove the liquid content thereof and thereby fracturing the resulting dried film; removing the fibers formed by the fracturing of said film from the smooth supporting surface, and thereafter sintering the fibers produced by the fracturing of said film during the removal of liquid, to close the capillaries in said fibers.

3. A method of preparing inorganic filaments of rectangular cross section and having aspect ratios as follows: length to thickness ratio of at least about 1000 to 1 and width to thickness ratio of between about 1 to 1 and 10 to 1, which comprises: spreading a thin film of a colloidal dispersion of a lyophobic sol of an inorganic material on a smooth solid surface, said film having a thickness between about 5 microns and 50 microns; drying the thin film by exposing it to temperatures between 20° C. and 220° C. for a time sufficient to remove the liquid content thereof and thereby fracturing the resulting dried film; removing the fibers formed by the fracturing of said film from the smooth supporting surface, and thereafter heating the fibers produced by the fracturing of said film during the removal of liquid, said heating being effected at a temperature and for a time sufficient to close the capillaries in said fibers.

4. A porous capillary containing filament in the form of a ribbon having a length to thickness ratio of at least about 100:1 and a width to thickness ratio between about 1:1 and 10:1 and composed of inorganic oxides selected from the group consisting of the oxides of silicon, zirconium, aluminum, chromium, and thorium and mixtures thereof with one another and with oxygen containing compounds of boron.

5. A porous capillary containing filament in the form of a ribbon having a length to thickness ratio of at least about 100:1 and a width to thickness ratio between about 2:1 and 4:1 and composed of inorganic oxides selected from the group consisting of the oxides of silicon, zirconium, aluminum, chromium, and thorium and mixtures thereof with one another and with oxygen containing compounds of boron.

6. A porous capillary containing filament in the form of a ribbon having a length to thickness ratio of at least about 100:1 and a width to thickness ratio between about 1:1 and 10:1 and composed of inorganic oxides selected from the group consisting of silica, zirconia, alumina, chromium oxide, thorium oxide and mixtures of said oxides with one another and with boric oxide.

7. Filaments in the form of non-porous ribbons of rectangular cross section, having lengths up to 3 inches; length to thickness ratios between about 100:1 and 10,000:1; width to thickness ratios between about 1:1 and 10:1 and consisting essentially of inorganic oxides selected from the group consisting of the oxides of silicon, zirconium, aluminum, chromium, and thorium and mixtures thereof with one another and with oxygen containing compounds of boron.

8. Filaments in the form of non-porous ribbons of rectangular cross section, having lengths up to 3 inches; length to thickness ratios between about 100:1 and 10,000:1; width to thickness ratios between about 2:1 and 4:1 and consisting essentially of inorganic oxides selected from the group consisting of the oxides of silicon, zirconium, aluminum, chromium, and thorium and mixtures thereof with one another and with oxygen containing compounds of boron.

9. Filaments in the form of non-porous ribbons of rectangular cross section, having lengths up to 3 inches; length to thickness ratios between about 100:1 and 10,000:1; width to thickness ratios between about 1:1 and 10:1 and consisting essentially of inorganic oxides selected from the group consisting of silica, zirconia, alumina, chromium oxide, thorium oxide and mixtures thereof with one another and with oxygen-containing compounds of boron.

10. A method of preparing filaments of rectangular cross section and having aspect ratios as follows: length to thickness ratio of at least about 1000 to 1 and width to thickness ratio of between about 1 to 1 and 10 to 1 of inorganic oxide which includes spreading a thin film of a colloidal dispersion of a lyophobic sol of said inorganic oxide on a smooth solid surface to which said sol does not adhere; removing the liquid content of said sol from said film by applying heat thereto, thereby drying said sol and producing a dried solid product in the form of filaments of said inorganic material, including the improvements which comprise: conducting said process with a lyophobic sol exhibiting a pH of between 2 and 6 and based on an oxygen containing compound of silicon, zirconium, aluminum, chromium, thorium and mixtures thereof with one another and with oxygen containing compounds of boron; conducting said process with an original wet film thickness between about 5 and 50 microns; effecting the liquid removal from said film of sol at about 180° C.; and after said filaments have formed, subjecting the filaments to temperatures sufficient to sinter said inorganic material, for a time sufficient to seal capillary passages in said filaments.

11. The process of claim 10 wherein the sol is a lyophobic silica sol.

12. The method of preparing inorganic filaments of rectangular cross section and having aspect ratios as follows: length to thickness ratio of at least about 1000 to 1 and width to thickness ratio of between about 1 to 1 and 10 to 1, which comprises: spreading a thin film of a lyophobic sol of an inorganic oxide material on a smooth solid surface of a material to which the lyophobic material does not adhere when it is dried thereon; drying the film to remove the carrier liquid content thereof, whereupon the drying sol simultaneously detaches itself from said solid surface and fractures into solid filaments and recovering the solid filaments produced by the removal of said liquid and the resultant fracturing of said film.

13. The method of preparing inorganic filaments of rectangular cross section and having aspect ratios as follows: length to thickness ratio of at least about 1000 to 1 and width to thickness ratio of between about 1 to 1 and 10 to 1, which comprises: spreading a thin film of a lyophobic sol of an inorganic oxide material selected from the group consisting of oxygen-containing compounds of silicon, zirconium, aluminum, chromium, thorium and mixtures thereof with one another and with oxygen-containing compounds of boron, on a smooth solid surface of a material to which the lyophobic material does not adhere when it is dried thereon; drying the film to remove the carrier liquid content thereof, whereupon the drying sol simultaneously detaches itself from said solid surface and fractures into solid filaments and recovering the solid filaments produced by the removal of said liquid and the resultant fracturing of said film.

14. The method of preparing silica filaments of rectangular cross section and having aspect ratios as follows: length to thickness ratio of at least about 1000 to 1 and width to thickness ratio of between about 1 to 1 and 10 to 1, which comprises: applying a thin film of a lyophobic aqueous silica sol to a smooth solid surface of a material to which the lyophobic material does not adhere when it is dried thereon, said lyophobic sol exhibiting a pH between 2 and 6; drying the film of lyophobic sol by exposing it to temperatures between 20° C. and 220° C. for a time sufficient to remove the carrier liquid content thereof, whereby as the carrier liquid is removed, first the edges of the film curl away from said solid surface and fracture into filaments and, as the removal of the carrier liquid continues the remainder of the film fractures and pulls away from the solid support, and recovering the silica filaments so produced.

15. The method of claim 14 wherein the lyophobic silica sol contains 15% silica by weight and the sol exhibits a pH of 4 measured at 25° C.

16. The method of claim 14 wherein the film is originally about 20 microns in thickness.

17. The method of preparing zirconia filaments of rectangular cross-section and having aspect ratios as follows: length to thickness ratio of at least about 1000 to 1 and width to thickness ratio of between about 1 to 1 and 10 to 1 which comprises: spreading a thin film of a lyophobic aqueous colloidal dispersion of zirconia on a smooth solid surface of a material to which the lyphobic material does not adhere when it is dried thereon; drying the film at about 180° C. for a time sufficient to remove the carrier liquid content thereof whereby, as the liquid is removed, first the edges of the film curl away from the solid surface and fracture into filaments, and as the removal of carrier liquid continues the remainder of the film fractures into filaments and pulls away from the solid surface, and recovering the zirconia filaments so produced.

18. The method of claim 17 wherein the thin film is originally about 20 microns in thickness.

19. The method of preparing inorganic filaments of rectangular cross section and having aspect ratios as follows: length to thickness ratio of at least about 1000 to 1 and width to thickness ratio of between about 1 to 1 and 10 to 1, which comprises: adding up to 4% by weight of boric acid to an aqueous dispersion of colloidal silica; spreading a thin film of the resulting lyophobic sol on a smooth solid surface of a material to which the lyophobic material does not adhere when it is dried thereon; drying the film at about 180° C. to remove the carrier liquid contant thereof, whereupon the drying sol simultaneously detaches itself from said solid surface and fractures into solid filaments, and recovering the solid filaments produced by the removal of said liquid and the resultant fracturing of said film.

20. The method of preparing inorganic filaments of rectangular cross section and having aspect ratios as follows: length to thickness ratio of at least about 1000 to 1 and width to thickness ratio of between about 1 to 1 and 10 to 1, which comprises: applying a thin film of a lyophobic sol of an inorganic oxide to a smooth solid surface of a material to which the lyophobic material does not adhere when it is dried thereon; inclining the solid surface about 30° to the horizontal; drying the lyophobic sol while it is supported on the inclined surface and for a time sufficient to remove the carrier liquid content thereof, whereupon the drying sol simultaneously detaches itself from said solid surface and fractures into solid filaments; and recovering the solid filaments so produced.

References Cited in the file of this patent

UNITED STATES PATENTS

| | | |
|---|---|---|
| 2,093,454 | Kistler | Sept. 21, 1937 |
| 2,266,636 | Hauser | Dec. 16, 1941 |
| 2,338,463 | Skaupy et al. | Jan. 4, 1944 |
| 2,442,976 | Heany | June 8, 1948 |
| 2,598,102 | Baxter | May 27, 1952 |
| 2,699,397 | Hahn | Jan. 11, 1955 |
| 2,710,261 | McMullen | June 7, 1955 |
| 2,736,141 | Silverman et al. | Feb. 28, 1956 |
| 2,787,965 | Luvisi | Apr. 9, 1957 |
| 2,787,968 | Luvisi | Apr. 9, 1957 |
| 2,886,404 | Teja | May 12, 1959 |
| 2,915,475 | Bugosh | Dec. 1, 1959 |

OTHER REFERENCES

The Colloid Chemistry of Silica and Silicates, Iler, published by Cornell University Press, 1955, p. 15. (Copy in Sci. Lib.)

Theory of the Stability of Lyophobic Colloids, Verwey, et al., published by Elsevier Publishing Co. Inc., 1948, pp. 1 and 11. (Copy in Sci. Lib.)

"Ludox" Colloidal Silica, pub. by E. I. Du Pont De Nemours & Co., Grasseku Chemicals Dept., Wilmington 98, Delaware. Received in Patent Office October 24, 1957. (Copy in Div. 64).